United States Patent [19]

Wada et al.

[11] Patent Number: 4,902,651
[45] Date of Patent: Feb. 20, 1990

[54] MATERIAL FOR MAGNETIC HEAD SUBSTRATE MEMBER

[75] Inventors: Toshiaki Wada, Takatsuki; Mitsuhiko Furukawa; Masaharu Shiroyama, both of Fukuoka; Mitsuyoshi Nagano, Saga; Michito Miyahara, Fukuoka; Takashi Kitahira, Fukuoka; Shigeki Mohri, Tosu, all of Japan

[73] Assignees: Sumitomo Special Metals, Co., Osaka; Nippon Tungsten Co., Ltd., Fukuoka, both of Japan

[21] Appl. No.: 21,227

[22] Filed: Mar. 3, 1987

[30] Foreign Application Priority Data

Jun. 20, 1986 [JP] Japan .................................. 61-144570
Sep. 5, 1986 [JP] Japan .................................. 61-209100

[51] Int. Cl.$^4$ ...................... C04B 35/56; C04B 35/46; C04B 35/10
[52] U.S. Cl. ........................................................ 501/87
[58] Field of Search .......................................... 501/87

[56] References Cited

U.S. PATENT DOCUMENTS

| | | | |
|---|---|---|---|
| 4,251,841 | 2/1981 | Jacobs | 501/87 |
| 4,543,343 | 9/1985 | Iyori et al. | 501/87 |
| 4,582,812 | 4/1986 | Furukawa et al. | 501/87 |
| 4,598,052 | 7/1986 | Wada et al. | 501/87 |

OTHER PUBLICATIONS

"Microstructurally Developed Toughening Mechanisms in Ceramics, Technical Report No. 3, Stress Induced Martensitic Reaction: II, Experiments in the $ZRO_2$-$Y_2)3$ System", F. F. Lange, Rockwell International, Thousand Oaks, California, Jul. 1987.

*Primary Examiner*—Mark L. Bell
*Attorney, Agent, or Firm*—Burns, Doane, Swecker & Mathis

[57] ABSTRACT

A material for thin film magnetic head slider particularly suited for high recording, which is obtained by sintering a mixture consisting essentially of:

5 to 45% by weight of titanium carbide component;
0.2 to 10% by weight of zirconium oxide;
0.05 to 2% by weight of oxide of yttrium;
0.2 to 25% by weight of aluminum nitride; and the balance of $Al_2O_3$ component substituted with 0.5 to 8% by weight being at least one machinability agent selected from the group consisting of oxides of Mg, Ca, B, Ni and Cr and complex oxides thereof.

30 Claims, No Drawings

MATERIAL FOR MAGNETIC HEAD SUBSTRATE MEMBER

FIELD OF THE INVENTION

This invention relates to a magnetic head substrate member, and, more particularly, it is concerned with a thin film magnetic head slider suitable for high density recording, and materials for such magnetic head substrate member.

BACKGROUND OF THE INVENTION

It has heretofore been a practice to manufacture the disc head slider for computer by machining ferrite materials in block form. However, since the ferrite material is low in its high frequency permeability, its input for recording and output for reading will be low when it is used as the magnetic head in a thin film magnetic circuit or at the time of high speed writing and reading of data. In recent years, however, general trend in this field of technology is such that inductance of the disc head is so reduced as to enable the disc head to be operated in a higher frequency region, and also a gap width is made so small as to improve its high speed writing and reading as well as its recording density.

Further, as has been observed in the recent trend in this field of technology, manufacture of the disc head in a thin film form has been positively and progressively undertaken in keeping up with increase in the recording density. As consequence of this, more and more stringent requirements have been imposed on the characteristic properties of the substrate materials for the thin film magnetic head, and there have been demands for development of those materials satisfying the undermentioned required characteristics.

(1) Crystal grains constituting the materials are so fine, uniform, and dense that they do not permit presence of micro-pores therein.

(2) The materials are excellent in their affinity with the recording medium, their sliding property, and their wear-resistant property.

(3) The materials have good machinability; that is to say, they have high speed machinability and are excellent in their precision machinability.

(4) The materials have good affinity with those materials to be coated on their surface.

In order to meet these demands, there have been developed a material for the ceramic substrate member for the thin film magnetic head suitable for high density recording, which is principally composed of aluminum oxide and titanium carbide (vide: Japanese Patent Kokai Publication No. 60-66403, etc.), and a composite material produced by forming a partial solid-solution of titanium nitride with titanium carbide. Besides the abovementioned components, there is added to aluminum oxide MgO, CaO, NiO or the like which are effective as the grain growth inhibitor or the sintering aid.

In such thin film magnetic head, particular requirements are such that not a single micro-pore should be present in the surface part of the substrate when it is subjected to the ultra-precision mirror surface finishing, and that the substrate has good precision machinability.

Therefore, with a view to rendering the substrate, which has been finished to have an ultra-precision mirror surface, to be free from such micro-pores, it is necessary that a mixture of powders for the substrate material is sintered to its theoretical density, and yet the bonding among the ceramic crystal grains is sufficiently strong so as to form a fine micro-structure. On the other hand, however, machinability of such ceramic sintered body is very poor.

In order therefore to solve this problem, there has been developed a material which is composed principally of, for example, aluminum oxide and titanium carbide, 5 parts by weight or less of a machinability agent such as MgO, NiO, etc. being added to 100 parts by weight of such principal component (vide: Japanese Patent Kokai Publication No. 57-135772).

SUMMARY OF THE DISCLOSURE

However, while these known composite materials are composed principally of $Al_2O_3$ and TiC added with an additive (or additives), such additive provides weak binding force between $Al_2O_3$ and TiC, hence the material as a whole is disadvantageously hard and brittle, with further problems of being inferior in its machinability, tending to readily bring about chipping upon the precision machining, and having micro-pores within the material.

It is therefore the primary object of the present invention to solve the abovementioned various problems inherent in the conventional materials for the magnetic head substrate member.

That is to say, the present invention is to provide a substrate member for a thin film magnetic head slider and a material for such substrate member, which is capable of imparting to the abovementioned $Al_2O_3$-TiC type material various characteristics required of the thin magnetic head slider, has the least micro-pores present therein, has good machinability, and has good precision machinability. The invention is also to provide a process for production of such material for the magnetic head substrate member.

According to the present invention in its general aspect, there is provided a material for magnetic head substrate member, which is obtained by sintering a mixture consisting essentially of: 5 to 45% by weight of titanium carbide component; 0.2 to 10% by weight of zirconium oxide; 0.05 to 2% by weight of oxide of yttrium; 0.2 to 25% by weight of aluminum nitride; and the balance being $Al_2O_3$ component substituted with 0.5 to 8% by weight of at least one machinability agent selected from the group consisting of oxides of Mg, Ca, B, Ni and Cr and complex oxides thereof.

It is another object of the present invention to provide a dispersion-reinforcement type composite ceramic material for the thin film magnetic head slider having increased bonding strength among various components in the material composition, increased toughness, and, therefore excellent machinability and ultra-precision machinability as well. Such composite ceramic material has been derived as the results of improvement in the preparation of starting material powder component and blending of the same with the $Al_2O_3$-TiC type or $Al_2O_3$-TiC with substitution type composite materials; improvement in dispersibility of the starting material powder component in the composite material in the course of its sintering step; and clarification of the mechanism of generation of micro-pores therein. Here, the abovementioned term "TiC with substitution type" is meant by a type of component, in which a part of titanium carbide is substituted with metal oxides (M.O.) and/or carbides, nitrides, borides, or composite compounds thereof.

Various kinds of materials according to the present invention which are principally composed of aluminum oxide and titanium carbide have excellent precision machinability as well as machinability which is equal to, or higher than, those of the conventional $Al_2O_3$-TiC type material, when it is used as the material for the magnetic head slider, and have the least micro-pores and very superior performance in its practical use.

In addition, since the materials according to the present invention can be prepared in a variety of compositions, they can be adapted to have much more superior properties as the materials for the thin film magnetic head slider by selection of a composition to be in good compatibility with a recording medium, or by selection of a material of a composition having good affinity with a material to be coated thereon.

The foregoing objects, other objects as well as specific construction and function of the material for the magnetic head substrate member according to the present invention, in particular, the compositional ratio of each and every component and the sintering conditions therefor, will become more apparent and understandable from the following detailed description thereof, when read in conjunction with the preferred examples.

DETAILED DESCRIPTION OF PREFERRED EMBODIMENTS

In the following, the present invention will be described in specific details with reference to preferred embodiments thereof.

Primarily, the object of the present invention as described above can be attained also with a magnetic head slider material produced by substitution of 10 to 50% by weight of titanium carbide in the abovementioned composite material with at least one kind of carbides, nitrides, borides of IVa, Va and VIa subgroup metals in the International Periodic Table, and composite compounds of these (i.e., carbo-nitride, carbo-boride, nitro-boride, and carbo-nitro-boride). This magnetic head slider material can be produced by pressure-sintering of a powder mixture of the composite material which has been subjected to a predetermined substitution treatment to provide a starting material powder for sintering. As the method for preparing said starting material powders of TiC or the substituent component therefor, these materials are mixed in powder form so that a part of titanium carbide may be substituted with a complex oxide containing therein one or more kinds of oxides of Ti, Ta and Nb, or at least two elements selected from Ti, Ta and Nb (such oxides will hereinafter be abbreviated as "M.O."), thereby forming a titanium carbide component. More preferably, such titanium carbide component is produced by subjecting the abovementioned powder mixture to a preliminary heat-treatment in a nonoxidizing atmosphere at a temperature ranging from 500° C. to 1,500° C. to thereby form a partial solid-solution of oxygen constituent in the metal oxide (M.O.) with titanium carbide.

Here, a ratio of the metal oxide (M.O.) with respect to the titanium carbide component containing therein the substituent component such as metal oxide (M.O.), etc. should be 0.15 or below by weight (but not including zero, preferably 0.01 or more), or, more preferably, in a range of from 0.05 to 0.15, for the exhibition of the improved effect in the characteristic properties of the material according to the present invention. In more detail, the metal oxides (M.O.) consisting of at least one kind of oxides of Ti, Ta and Nb, or complex oxides of these have the function and effect of forming, on one hand, partial solid-solution with titanium carbide, and reacting, on the other hand, to combine with alumina ($Al_2O_3$) component in the course of the sintering process, as the consequence of which the metal oxide (M.O.) works as a strong binder between the titanium carbide component and the alumina component to increase toughness of the sintered body and precision machinability thereof. The ratio of this metal oxide (M.O.) should also preferably be 0.15 or below by weight (but not including zero and preferably 0.01 or more) even with respect to the titanium carbide component, in which 10 to 50% by weight of TiC has been substituted with at least one kind of carbides, nitrides and borides of the IVa, Va and VIa subgroup metals, or composite compounds thereof. Examples of the IVa, Va and VIa subgroup metals are Ti, Zr, Hf (IVa); V, Nb, Ta (Va); and Cr, Mo, W (VIa), of which one or more of Ti, Zr, V, Nb, Ta and Hf are preferable.

As for the alumina ($Al_2O_3$) component, 0.5 to 8% by weight of $Al_2O_3$ is substituted with the afore-mentioned machinability agent which may be mixed in powder form, or more preferably, a powder material obtained by doping $Al_2O_3$ with a salt of the machinability agent, or a powder mixture of the machinability agent and $Al_2O_3$ in predetermined quantities may be preheated at a temperature ranging from 650° C. to 1,300° C. to be reacted each other for bonding. By mixing the oxides of Mg, Ca, B, Ni and Cr as the machinability agent with the aluminum oxide ($Al_2O_3$)-titanium carbide (TiC) type material which is primarily a hard material, the machinability of the resulting material can be improved to a great extent, which gives a great deal of effect in improving the machining efficiency of the material in case it is subjected to the micro-machining and ultra-precision machining.

As the method for mixing this machinability agent, there may be adopted a simple powder mixing method. By conducting, however, a reactive bonding treatment through preheating, there can be obtained a material having very uniformly dispersed machinability agent in its micro-structure, which gives a resulting effect of no chipping to occur at the edge portions of the material in the course of its ultra-precision machining.

While it is possible to obtain such machinability (high speed machinability) that has not so far been experienced in the conventional material with the material obtained from mixing of the machinability agent by the simple powder mixing method, this powder mixing method had a somewhat inferior aspect to the method of reactive bonding treatment by preheating in point of the uniform dispersibility. The reason for this is that, at the subsequent wet-type pulversizing and mixing process steps, the oxide turns into a hydroxide by a reaction of, for example, MgO→Mg(OH)$_2$, and this hydroxide possesses a coagulating property to some extent.

Furthermore, of various machinability agents, boron oxide acts as a powerful binder for aluminum oxide and a boride in a material, in which 10 to 50% by weight of the titanium carbide component has been substituted with such boride or a composite compound of the boride, hence it exhibits an effect of improving the toughness and precision-machinability of the material.

As for the oxide of yttrium, it may be blended in the form of $Y_2O_3$ at the time of the powder mixing of various powder materials according to the present invention, or more preferably, it may be blended in the form of a complex oxide of $Al_2O_3$ and $Y_2O_3$ at a ratio of 0.05 to 2% by weight in terms calculated on $Y_2O_3$. As this complex oxide, there may also be used, for example, garnets to be represented by formulas ranging from $Y_3(Al,Y)_2\text{-}(AlO_4)_3$ to $(Y,Al)_3Al_2\text{-}(AlO_4)_3$; garnet having its composition of $Y_3Al_2(AlO_4)_3$; or other complex oxides than garnets such as aluminum-yttrium type complex oxides to be represented by a general formula of $Y_xAl_{1-x}O_3$ (where: $x<1$, preferably $0.2 \leqq x \leqq 0.7$).

The oxides of yttrium imparts remarkable sintering acceleration effect to any combination of the material compositions according to the present invention. In particular, when the oxide is blended to be a comlex oxide with aluminum, it imparts a remarkable effect of decreasing the micro-pores within the material, and also exhibits an effect of firmly bonding zirconium oxide as the other essential component with aluminum oxide.

Zirconium oxide to be used may be in the form of pure $ZrO_2$ or those which have been partially stabilized with at least one kind of $Y_2O_3$, MgO, CaO and CeO, or more preferably, use may be made of pure $ZrO_2$ having a particle size of 0.3 $\mu$m or below, or zirconia in powder form having a particle size of 0.3 $\mu$m or below, and having been partially stabilized with certain amount of a stabilizer, e.g., at least one of 1–6 mol % $Y_2O_3$, 6–12 mol % MgO and/or CaO, and 6–10 mol % CeO, (particularly $Y_2O_3$).

Zirconium oxide or partially stabilized zirconia imparts the grain growth inhibiting effect to the whole compositions of the material according to the present invention. Besides this, it gives a great deal of effect in the ultra-precision machinability due to improvement in its toughness, along with the remarkable effect in improving its affinity, sliding property and wear-resistant property with a recording medium. It further gives the sintering-promoting effect.

Furthermore, in recent years, it has become a conspicuous tendency that chromium type recording medium is adopted in place of ferrite type recording medium. As the consequence of this, the conventional materials obtained by admixing the machinability agent with the principal component of aluminum oxide and titanium carbide have the points to be improved in respect of their affinity, sliding property, and wear-resistant property with chromium. More specifically, increase in the read output loss to be ascribable to progressive wear due to chromium adhesion wear and drop-out wear and wear of the chromium type recording medium tends to occupy a predominant part in these problems.

As the measures for improvements, it has been contemplated and practised to blend aluminum nitride and zirconium oxide, whereby the sliding property improves, which in turn reflects on improvement in the wear resistant property of the material for the magnetic head substrate member, accompanied by the effect of remarkable decrease in the read output loss.

Aluminum nitride, by its blending, also acts as the grain growth inhibitor as well as a powerful binder between carbides, nitrides, borides and composite compounds thereof and the aluminum oxide component. As the consequence of this, the compound contributes to the ultra-precision machinability of the material due to its sintering-promoting effect and toughness improving effect. A preferred average particle diameter of aluminum nitride is 1 $\mu$m or below for a greater resulting effect.

In case 10 to 15% by weight of the titanium carbide component is substituted with nitrides, borides and carbides of IVa, Va and VIa subgroup metals, and composite compounds thereof, there accrue such effects that a material having uniform micro-structure and improved precision machinability can be obtained as the result of growth inhibition of the crystal grains in the titanium carbide component, while maintaining the characteristic properties of the $Al_2O_3$-TiC composite material.

Finally, it should also be noted that possibility of minimizing the residual quantity of the micro-pores in the material is one of the characteristic properties of the present invention. The reason for the relatively large quantity of the residual micro-pores in the conventional materials may be assumed by that $TiO_2$, MgO, $Y_2O_3$, and so on, which are other mixing components than $Al_2O_3$ and TiC in the conventional material, are present as simple and independent oxides.

That is to say, $TiO_2$ reacts with free carbon in the TiC component or CO gas to generate from the sintering atmosphere to cause the reactive gas (CO, $CO_2$) as generated to remain in the micro-structure of the material. It also becomes a cause for forming the micro-pores at the time of producing solid-solution with TiC. Further, MgO tends to be readily turned into $Mg(OH)_2$ at the time of the wet-mixing, and, because of its dehydration during the sintering process, it causes micro-pores to remain within the material, while $Y_2O_3$ reacts with free carbon as well as $Al_2O_3$ to cause the micro-pores to be generated. In contrast to this, when the material for the magnetic head substrate member according to the present invention is produced from a mixture powder of the titanium carbide component treated for solid-solution, the garnets (or the like), $Al_2O_3$, and the machinability agent, the abovementioned micro-pore-retaining factor is lessened, whereby the material with the least content of the micro-pores can be obtained.

As the pressure-sintering method, there may be adopted the hot press method or the hot isostatic press (HIP) sintering method for satisfying various required characteristics of the material according to the present invention. The hot press method produces a material having good characteristics by holding the same for a time period required for it to attain a densified structure in a non-oxidizing atmosphere, under an applied pressure of 50 kgf/cm$^2$ or above, and at a temperature ranging from 1,350° C. to 1,750° C. When the material is kept under the abovementioned conditions over a prolonged period of time after it has attained the densified structure, there would be apprehension of the grain growth, which is not preferable. The hot isostatic press (HIP) sintering method is able to produce the material according to the present invention by subjecting a pre-sintered body having a relative density of from 94 to 98% and manufactured by the normal sintering method (i.e., cold press followed by sintering without excerting kinetic pressure upon the compact to be sintered) or the hot press method to the densifying treatment; in more detail, by holding the pre-sintered body in an inactive gas atmosphere (Ar, $N_2$, etc.) for 0.5 to 2 hours, under a pressure application of from 500 to 2,000 kgf/cm$^2$, and at a temperature ranging from 1,000° C. to 1,600° C.

Incidentally, when the material sintered by the hot isostatic press (HIP) sintering method or the hot press method is subjected to heat-treatment in a non-oxidizing atmosphere under a pressure application of from 0 to 10 kgf/cm$^2$ and at a temperature ranging from 1,000° C. to a (sintering temperature + 100° C.), it becomes possible to remove the stress in the material. As the consequence, the thus heat-treated material does not bring about fine chipping due to the stress during the precision machining and has good bonding with the coating film, hence the material of very excellent quality can be obtained from such heat-treatment. This heat treatment is made for a sufficient period of time to remove the stress, preferably for 0.5–2 hours.

In the material for the magnetic head substrate member according to the present invention, the reason for limiting the compositional ranges is as follows.

TiC constitutes the principal component along with $Al_2O_3$ in the resultant material according to the present invention. With the TiC component being below 5% by weight, it is difficult to obtain a material having a very fine crystal grain size, and moreover, there emerges notable difficulty in the machinability of the material due to $Al_2O_3$. As the result of this, the material is not suitable for multi-step machining as contemplated in the present invention. When the TiC content is 5% by weight or above, the economical machining efficiency can be attained and the precision machinability improves. Also, when the TiC component exceeds 45% by weight, the machinability of the material improves, but the sintering temperature is required to be increased. On the other hand, as the result of the progressive growth of the crystal grains of both TiC and $Al_2O_3$, the material exhibits its unfavorable precision machinability. A preferred range of the TiC component ranges from 10 to 40% by weight.

The method for producing the titanium carbide component by substituting the oxides such as Ti, Ta, Nb, etc. or the complex oxides thereof for a part of TiC is classified into the method of mixing the starting material powders and the method of reactive bonding by preheating. From the standpoint of the strengthened bonding as well as the promoted sintering effect between $Al_2O_3$ and TiC, it may be effective to adjust the quantity of the metal oxide (M.O.) in the titanium carbide component to be 15% by weight or below (but not including zero, preferably 1% or more), or more preferably from 5 to 15% by weight, at the stage of mixing of the starting material powders for sintering.

In some case, the metal oxide (M.O.) in the above-mentioned quantity of 15% by weight or below (but not including zero) may be reduced or carbonized with free carbon contained in the starting material powders for sintering or CO gas to be generated from the sintering atmosphere in the course of the sintering treatment. Since the quantity of the metal oxide (M.O.) which can be substituted with TiC is 15% by weight at the most, it may remain in the sintered material in the form of carbides, suboxides, or oxycarbides. In this sense, the metal oxides (M.O.) in the present invention is understood to contain suboxides and/or oxycarbides of Ti, Ta, Nb, etc., besides the oxides of Ti, Ta, Nb, etc., or complex oxides of these.

Accordingly, when the metal oxide (M.O.) as the substituent material for TiC exceeds 15% by weight, it undergoes reaction and adhesion with the graphite mold in the hot press method to be the cause for cracks, and also it would badly increase brittleness of the material due to increase in the micropores therein as well as excessive solid-solution of oxygen with TiC, with the result that the required characteristics of the material cannot be satisfied.

The $Al_2O_3$ component should preferably be in an amount of 18% by weight or more, or more preferably, from 35 to 88% by weight. Here, the $Al_2O_3$ component is designated by those which contain therein the machinability agent (as the substituent component for a part of $Al_2O_3$).

Oxides of Mg, Ca, B, Ni and Cr or complex oxides of these as the machinability agent are all in possession of the similar effect. For effective improvement in the machinability of the material, it is preferable to use the aluminum oxide component which has been substituted with 0.5 to 8% by weight of at least one kind of these oxides with respect to $Al_2O_3$. With the oxide not reaching 0.5% by weight, it only acts as the grain growth inhibitor and does not contribute to improvement in the machinability. On the contrary, when the oxide exceeds 8% by weight, the grain growth in the aluminum oxide component is accelerated, whereby the mechanical strength of the material lowers unfavorably. A preferred range for the machinability agent is from 1 to 6% by weight.

With a range of substitution of TiC with at least one kind of carbides, nitrides and borides of IVa, Va and VIa subgroup metals in the Periodic Table of the International version and composite compounds of these being 10% by weight or less, there comes out no effect of improvement in the characteristics of the material. When the range exceeds 50% by weight, on the contrary, the sintering temperature tends to be higher, which would cause precision machinability of the material to deteriorate. The material having the excellent characteristics can be obtained with addition of these compound in a quantity ranging from 10 to 50% by weight, or more preferably from 10 to 35% by weight.

With the quantity of zirconium oxide or partially stabilized zirconia not reaching 0.2% by weight, there is less effect of improvement in the grain growth inhibition in the material, the toughness thereof, the affinity, sliding property and wear-resistant property thereof with the recording medium. By blending such zirconium oxide or partially stabilized zirconia in a range of from 0.2 to 10% by weight, there can be obtained the material having the improved toughness and the excellent ultra-precision machinability, and, moreover, the material exhibits a significant effect of improvement in its affinity with various kinds of recording medium as well as its wear-resistant property along with its improved sliding property, and further decrease in its read output loss (i.e., loss in the reproduction output of the stored data). On the contrary, when the quantity of zirconium oxide or partially stabilized zirconia exceeds 10% by weight, the toughness of the material improves at the sacrifice of the machinability (high speed machinability) to a considerable degree with the consequence that the material becomes unsuitable in view of its economical aspect as the material for the multi-stage machining as intended by the present invention. A preferred range of such zirconium oxide or partially stabilized zirconia is from 0.5 to 5% by weight. Incidentally, the stabilizing agent to be used may be in said specific ranges of from 1 to 12 mols with respect to $ZrO_2$ depending on the kind.

With the oxide of yttrium being 0.05% by weight or less, its effect as the sintering-aid (i.e., the low temperature sinterability) does not appear. On the contrary, when its quantity exceeds 2% by weight, there is unfavorable tendency such that the crystal grain growth is brought about, or multitude of micropores are generated in the material. A preferred range of the oxide of yttrium is therefore from 0.05 to 2% by weight, or more preferably, from 0.05 to 1% by weight.

With the quantity of aluminum nitride not reaching 0.2% by weight, no effect of improving the read output loss in the resulting material and its required function and effect do not appear. On the contrary, when it exceeds 25% by weight, hardness of the material is impaired to deteriorate the wear-resistant property of the material. Therefore, a preferred range of aluminum nitride is set to be from 0.2 to 25% by weight, or more preferably, from 2 to 20% by weight.

With a view of enabling those skilled in the art to put the present invention into practice, the following preferred examples of the method for producing the slider material for the thin film magnetic head substrate member and various properties of the material are presented. It should, however, be noted that the invention is not limited to these examples alone, but any changes and modifications may be made by those persons skilled in the art to the ingredients, their compositional ratio, and conditions for production of the material within the spirit and scope of the present invention as recited in the appended claims.

| Starting Materials in Powder | |
| --- | --- |
| (a) α-$Al_2O_3$ | average particle size of 0.5 μm; purity of 99.9%, |
| (b) titanium carbide | average particle size of 1 μm; impurity content (other than TiC and oxygen) of 0.1%, |
| (c) carbides, nitrides and borides of IVa, Va and VIa subgroup metals in the Periodic Table and composite compounds thereof average particle size of 1 μm; impurity content (other than the respective constituent elements, except oxygen) of 0.3% or below, | |
| (d) machinability agent | average particle size of single oxide of 0.5 μm; purity of 99.9%: (purity of salts to be used for doping being 99.9% or more) |
| (e) zirconium oxide | average particle size of 1 μm or below; purity of 99.9% or above (a purity inclusive of the partial stabilizer): |
| (f) oxide of yttrium | average particle size of 1 μm; purity of 99.9%: |
| (g) aluminum nitride | average particle size of 1 μm; impurity content (exclusive of |

| -continued |
| --- |
| Starting Materials in Powder |
| oxygen) of 0.1%. |

EXAMPLE 1

With the various starting materials as listed above, various substituted powders and composite powders were prepared, from which the specimen materials having the compositions as shown in Tables 1 to 3 below were obtained. The hot pressing was carried out by holding these specimen materials for 60 minutes under the optimum conditions of the sintering temperature ranging from 1,350° C. to 1,750° C. and the applied pressure of 200 kgf/cm$^2$, thereby containing sintered bodies, each having a dimension of 50×50×5.5 mm. Then, each of the sintered bodies having various compositions was ground by means of a diamond grinding wheel to have a finished dimension of 49×49×5.0 mm, followed by measurement of its specific gravity. After this, further cutting or grinding was effected on the sintered body to prepare a test specimen for various tests. The test results are shown in Table 4 below in terms of the characteristic properties of each specimen.

Table 5 below indicates various characteristic properties of the specimen materials, wherein the quantity of the titanium carbide component which was substituted by $TiO_2$ so that the amount of $TiO_2$ in the titanium carbide component may be 10% by weight, the quantity of aluminum nitride (AlN), and the quantity of $Y_2O_3$ are kept constant at 35% by weight, 25% by weight and 0.2% by weight, respectively; and wherein the quantity of the alumina component substituted with 4.0% by weight of MgO and then treated for the reactive bonding by pre-heating, and the quantity of partially stabilized zirconia with 3 mol % of $Y_2O_3$ are varied.

Further, Table 6 below indicates various characteristic properties of the specimen materials, wherein the quantity of the titanium carbide component which was substituted with $TiO_2$ so that the amount of $TiO_2$ in the titanium carbide component may be 10% by weight, the quantity of garnet represented by a formula $Y_3(Al\ Y)_2(AlO_4)_3$ calculated on $Y_2O_3$, and the quantity of partially stabilized zirconia with 3 mol % of $Y_2O_3$ are kept constant at 30% by weight, 0.2% by weight, and 5% by weight, respectively; and wherein the quantity of aluminum nitride is varied.

As for the evaluations A, B and C for the characteristic properties of the material as shown in Tables 4, 5 and 6, explanations will be given later.

TABLE 1

| weight % | \multicolumn{24}{c}{Sample No.} | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| TiC component | 5 | 10 | 15 | 20 | 30 | 40 | 45 | 50 | 40 | 40 | 40 | 40 | 40 | 40 | 40 | 40 | 40 | 40 | 40 | 40 | 40 | 40 | 40 | 40 |
| Al$_2$O$_3$ component | 90.5 | 85.5 | 80.5 | 75.5 | 65.5 | 55.5 | 50.5 | 45.5 | 55.5 | 55.5 | 55.5 | 55.5 | 55.5 | 58 | 58 | 58 | 58 | 58 | 57.55 | 57.55 | 57.55 | 57.55 | 58.45 | 58.45 |
| Ti oxide | 10 | 10 | 10 | 10 | 10 | 10 | 10 | 10 | | | | | | | | | | | 10 | | | | | 10 |
| Ta oxide | | | | | | | | | 4 | 5 | 10 | 15 | 18 | 4 | 5 | 10 | 15 | 18 | | 10 | | | | |
| Nb oxide | | | | | | | | | | | | | | 2 | 2 | 2 | 2 | 2 | | | 10 | | | |
| MgO | 2 | 2 | 2 | 2 | 2 | 2 | 2 | 2 | | | | | | | | | | | | | | | | |
| CaO | | | | | | | | | 2 | | | | | | | | | | | | | | | |
| B$_2$O$_3$ | | | | | | | | | | 2 | | | | | | | | | 2 | 2 | 2 | | | |
| NiO | | | | | | | | | | | 2 | | | | | | | | | | | 2 | | |
| Cr$_2$O$_3$ | | | | | | | | | | | | | 2 | | | | | | | | | | | |
| ZrC | | | | | | | | | | | | | | | | | | | | | | | 0.3 | 0.5 |
| HfC | | | | | | | | | | | | | | | | | | | | | | | | |
| VC | | | | | | | | | | | | | | | | | | | | | | | | |
| NbC | | | | | | | | | | | | | | | | | | | | | | | | |
| TaC | | | | | | | | | | | | | | | | | | | | | | | | |
| Mo$_2$C | | | | | | | | | | | | | | | | | | | | | | | | |
| WC | | | | | | | | | | | | | | | | | | | | | | | | |
| Ti nitride | | | | | | | | | | | | | | | | | | | | | | | | |
| Zr nitride | | | | | | | | | | | | | | | | | | | | | | | | |
| V nitride | | | | | | | | | | | | | | | | | | | | | | | | |
| Nb nitride | | | | | | | | | | | | | | | | | | | | | | | | |
| Ta nitride | | | | | | | | | | | | | | | | | | | | | | | | |
| Ti boride | | | | | | | | | | | | | | | | | | | | | | | | |
| Zr boride | | | | | | | | | | | | | | | | | | | | | | | | |
| Hf boride | | | | | | | | | | | | | | | | | | | | | | | | |
| V boride | | | | | | | | | | | | | | | | | | | | | | | | |
| Nb boride | | | | | | | | | | | | | | | | | | | | | | | | |
| Ta boride | | | | | | | | | | | | | | | | | | | | | | | | |
| ZrO$_2$ | 1 | 1 | 1 | 1 | 1 | 1 | 1 | 1 | 1 | 1 | 1 | 1 | 1 | 0.5 | 0.5 | 0.5 | 0.5 | 0.5 | 2.0 | 2.0 | 2.0 | 2.0 | 0.25 | 0.25 |
| Y$_2$O$_3$ | 0.5 | 0.5 | 0.5 | 0.5 | 0.5 | 0.5 | 0.5 | 0.5 | 0.5 | 0.5 | 0.5 | 0.5 | 0.5 | 0.3 | 0.3 | 0.3 | 0.3 | 0.3 | 0.05 | 0.05 | 0.05 | 0.05 | 1.0 | 1.0 |
| AlN | 3 | 3 | 3 | 3 | 3 | 3 | 3 | 3 | 3 | 3 | 3 | 3 | 3 | 1.2 | 1.2 | 1.2 | 1.2 | 1.2 | 0.5 | 0.5 | 0.5 | 0.5 | 0.3 | 0.3 |

TABLE 2

| Weight % | 25 | 26 | 27 | 28 | 29 | 30 | 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|---|---|---|---|---|---|
| TiC component | 40 | 40 | 40 | 37 | 36 | 20 | 18 | 25 | 25 | 25 | 25 | 25 | 25 | 37 | 36 | 20 | 18 | 20 | 20 | 20 | 20 | 37 |
| Al₂O₃ component | 58.45 | 58.45 | 58.45 | 57.4 | 57.4 | 57.4 | 57.4 | 57.5 | 57.5 | 57.5 | 57.5 | 57.5 | 57.5 | 54 | 54 | 54 | 54 | 61 | 61 | 61 | 61 | 56.25 |
| Ti oxide | | 10 | 10 | 10 | 10 | 10 | 10 | | | 5 | 5 | 5 | 5 | 10 | 10 | 10 | 10 | 10 | 10 | 5 | 5 | 7.5 |
| Ta oxide | | | | | | | | 10 | | | | | | | | | | 5 | | 10 | | |
| Nb oxide | | | | | | | | | 10 | | | | | | | | | | 5 | | 10 | |
| MgO | | | | 1 | | | | | | 5 | | | | | 4 | 4 | 4 | 2 | 2 | 2 | 2 | |
| CaO | | | | 1 | 1 | 1 | 1 | | | | | | | | | | | 1 | | | | |
| B₂O₃ | 5 | 8 | 9 | | | | | 3 | 3 | 3 | | | | | | | | | | | | |
| NiO | | | | | | | | | | | 3 | | | | | | | | | | | |
| Cr₂O₃ | | | | | | | | | | | | 3 | | | | | | | 1 | 1 | 1 | |
| ZrC | | | | 3 | 4 | 20 | 22 | 15 | | | | | | | | | | | | | | |
| NfC | | | | | | | | | 15 | | | | | | | 20 | | | | | | |
| VC | | | | | | | | | | 15 | | | | | | | 22 | | | | | |
| NbC | | | | | | | | | | | 15 | | | | | | | | | | | |
| TaC | | | | | | | | | | | | 15 | | | | | | | | | | |
| Mo₂C | | | | | | | | | | | | | 15 | | | | | | | | | |
| WC | | | | | | | | | | | | | | 3 | 4 | | | 15 | | | | |
| Ti nitride | | | | | | | | | | | | | | | | | | | 15 | | | |
| Zr nitride | | | | | | | | | | | | | | | | | | | | 15 | | |
| V nitride | | | | | | | | | | | | | | | | | | | | | 15 | |
| Nb nitride | | | | | | | | | | | | | | | | | | | | | | |
| Ta nitride | | | | | | | | | | | | | | | | | | | | | | |
| Ti boride | | | | | | | | | | | | | | | | | | | | | | 3 |
| Zr boride | | | | | | | | | | | | | | | | | | | | | | |
| Hf boride | | | | | | | | | | | | | | | | | | | | | | |
| V boride | | | | | | | | | | | | | | | | | | | | | | |
| Nb boride | | | | | | | | | | | | | | | | | | | | | | |
| Ta boride | | | | | | | | | | | | | | | | | | | | | | |
| ZrO₂ | 0.25 | 0.25 | 0.25 | 1.5 | 1.5 | 1.5 | 1.5 | 0.75 | 0.75 | 0.75 | 0.75 | 0.75 | 0.75 | 0.5 | 0.5 | 0.5 | 0.5 | 1.25 | 1.25 | 1.25 | 1.25 | 1.75 |
| Y₂O₃ | 1.0 | 1.0 | 1.0 | 0.1 | 0.1 | 0.1 | 0.1 | 0.25 | 0.25 | 0.25 | 0.25 | 0.25 | 0.25 | 1.5 | 1.5 | 1.5 | 1.5 | 0.75 | 0.75 | 0.75 | 0.75 | 1.25 |
| AlN | 0.3 | 0.3 | 0.3 | 1.0 | 1.0 | 1.0 | 1.0 | 1.5 | 1.5 | 1.5 | 1.5 | 1.5 | 1.5 | 4 | 4 | 4 | 4 | 2.0 | 2.0 | 2.0 | 2.0 | 0.75 |

TABLE 3

| Weight % | Sample No. | | | | | | | | | | | | | | | | | | | | | |
|---|---|---|---|---|---|---|---|---|---|---|---|---|---|---|---|---|---|---|---|---|---|---|
| | 47 | 48 | 49 | 50 | 51 | 52 | 53 | 54 | 55 | 56 | 57 | 58 | 59 | 60 | 61 | 62 | 63 | 64 | 65 | 66 | 67 | 68 |
| TiC component | 36 | 20 | 18 | 20 | 20 | 20 | 20 | 20 | 35 | 35 | 35 | 30 | 30 | 40 | 40 | 40 | 45 | 45 | 35 | 35 | 35 | 35 |
| Al$_2$O$_3$ component | 56.25 | 56.25 | 56.25 | 58.5 | 58.5 | 58.5 | 58.5 | 58.5 | 64.4 | 64.35 | 63.05 | 62.55 | 62.35 | 52.72 | 52.7 | 51.75 | 50.75 | 50.55 | 57.85 | 57.8 | 53 | 52.5 |
| Ti oxide | 7.5 | 7.5 | 7.5 | 5 | 5 | 5 | 5 | 5 | 10 | 10 | 10 | 10 | 10 | 10 | 10 | 10 | 10 | 10 | 10 | 10 | 10 | 10 |
| Ta oxide | | | | 2 | 2 | 2 | | 2 | | | | | | | | | | | | | | |
| Nb oxide | | | | | 2 | | 2 | | | | | | | | | | | | | | | |
| MgO | 1 | 1 | 1 | | | | | 1 | | | 3 | 3 | 3 | 4 | 4 | 4 | 4 | 4 | 6 | 6 | 6 | 6 |
| CaO | | | | 1 | | 2 | 1 | | 3 | 3 | 3 | 3 | 3 | | | | | | | | | |
| B$_2$O$_3$ | 2 | 2 | 2 | 2 | 2 | 2 | 2 | 2 | | | | | | | | | | | | | | |
| NiO | | | | | 1 | | | | | | | | | | | | | | | | | |
| Cr$_2$O$_3$ | | | | | | | | | | | | | | | | | | | 1 | 1 | 1 | 1 |
| ZrC | | | | | | | | | | | | | | | | | | | | | | |
| HfC | | | | | | | | | | | | | | | | | | | | | | |
| VC | | | | | | | | | | | | | | | | | | | | | | |
| NbC | | | | | | | | | | | | | | | | | | | | | | |
| TaC | | | | | | | | | | | | | | | | | | | | | | |
| Mo$_2$C | | | | | | | | | | | | 5 | 5 | 5 | 5 | 5 | | | | | | |
| WC | | | | | | | | | | | | | | | | | | | | | | |
| Ti nitride | | | | 5 | | | | | | | | | | | | | | | | | | |
| Zr nitride | | | | | 5 | | | | | | | | | | | | | | | | | |
| V nitride | | | | | | 5 | | | | | | | | | | | | | | | | |
| Nb nitride | | | | | | | 5 | | | | | | | | | | | | | | | |
| Ta nitride | | | | | | | | 5 | | | | | | | | | | | | | | |
| Ti boride | 4 | | | | | | | | | | | | | | | | | | | | | |
| Zr boride | | 20 | 22 | 15 | | | | | | | | | | | | | | | 5 | 5 | 5 | 5 |
| Hf boride | | | | | 15 | | | | | | | | | | | | | | | | | |
| V boride | | | | | | 15 | | | | | | | | | | | | | | | | |
| Nb boride | | | | | | | 15 | | | | | | | | | | | | | | | |
| Ta boride | | | | | | | | 15 | | | | | | | | | | | | | | |
| ZrO$_2$ | 1.75 | 1.75 | 1.75 | 0.5 | 0.5 | 0.5 | 0.5 | 0.5 | 0.15 | 0.2 | 1.5 | 2.0 | 2.2 | 0.25 | 0.25 | 0.25 | 0.25 | 0.25 | 1.0 | 1.0 | 1.0 | 1.0 |
| Y$_2$O$_3$ | 1.25 | 1.25 | 1.25 | 0.5 | 0.5 | 0.5 | 0.5 | 0.5 | 0.25 | 0.25 | 0.25 | 0.25 | 0.25 | 0.03 | 0.05 | 1 | 2 | 2.2 | 1.0 | 1.0 | 1.0 | 1.0 |
| AlN | 0.75 | 0.75 | 0.75 | 0.5 | 0.5 | 0.5 | 0.5 | 0.5 | 0.2 | 0.2 | 0.2 | 0.2 | 0.2 | 2 | 2 | 2 | 2 | 2 | 0.15 | 0.2 | 5 | 5.5 |

TABLE 4

| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| relative density | B | A | A | B | A | A | A | B | B | A | A | B | C | C | B | A | A | C | A | A | A | A | A | A | A | A | B | A | A | A | B | C | A | A | A |
| bending strength | B | B | B | B | B | A | A | B | B | B | A | B | C | B | B | A | B | B | B | B | A | A | A | A | B | B | B | A | A | A | B | A | B | A | A |
| grain size | B | B | B | B | A | A | A | B | B | B | A | A | B | B | B | A | A | B | B | B | A | A | B | A | A | B | C | B | A | A | B | A | A | A | A |
| porosity | A | B | A | A | A | A | B | C | B | A | B | A | C | B | A | A | B | C | A | B | A | A | A | A | A | C | B | B | A | B | C | B | A | A | A |
| precision machinability | B | B | B | B | A | A | A | A | B | A | A | B | C | B | A | A | A | C | B | B | A | A | A | B | A | A | A | A | A | A | B | A | B | A | A |
| machinability | B | B | B | B | B | A | B | A | B | B | A | B | B | B | B | A | A | B | A | B | A | A | C | B | A | A | A | A | A | A | B | B | A | A | A |
| read output loss | B | B | B | B | B | A | B | B | B | A | A | B | C | B | A | B | B | C | B | B | B | B | B | B | B | B | B | B | B | B | B | B | B | B | B |

| No. | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|---|---|---|---|---|---|---|---|---|---|---|---|---|---|---|---|---|---|
| relative density | B | B | A | A | B | C | A | B | A | A | A | A | A | C | A | A | A | A | A | B | A | A | A | A | C | B | A | A | B | B | A | B | B |
| bending strength | A | A | B | B | A | B | A | B | A | A | A | A | B | B | A | A | B | A | A | B | A | A | A | A | B | A | A | A | B | C | B | A | A |
| grain size | A | A | B | A | A | A | A | A | A | A | B | A | A | B | A | A | A | A | A | C | B | A | A | A | C | B | A | A | B | B | A | A | B |
| porosity | B | B | A | A | B | C | A | B | A | A | A | A | B | C | A | A | A | A | A | B | A | A | A | B | B | B | B | B | C | C | A | B | B |
| precision machinability | A | A | A | A | A | B | A | A | A | A | A | A | A | B | A | A | A | A | A | B | A | A | A | A | A | A | A | A | B | B | A | A | A |
| machinability | A | A | A | A | A | A | B | B | B | B | A | A | A | A | B | A | A | A | B | B | A | A | A | B | B | A | A | A | B | B | A | A | B |
| read output loss | B | B | A | A | A | A | B | B | A | A | B | A | B | B | B | B | B | B | B | B | B | B | B | B | B | B | B | B | A | C | B | A | A |

TABLE 5

| Sample No. | 69 | 70 | 71 | 72 | 73 | 74 | 75 | 76 | 77 |
|---|---|---|---|---|---|---|---|---|---|
| weight % | | | | | | | | | |
| TiC component | 35 | 35 | 35 | 35 | 35 | 35 | 35 | 35 | 35 |
| $Al_2O_3$ component | 62.2 | 62 | 61.5 | 60.5 | 57.5 | 55.5 | 52.5 | 50.5 | 47.5 |
| AlN | 2.5 | 2.5 | 2.5 | 2.5 | 2.5 | 2.5 | 2.5 | 2.5 | 2.5 |
| $Y_2O_3$ | 0.2 | 0.2 | 0.2 | 0.2 | 0.2 | 0.2 | 0.2 | 0.2 | 0.2 |
| $ZrO_2$ component | 0.3 | 0.5 | 1 | 2 | 5 | 7 | 10 | 12 | 15 |
| properties | | | | | | | | | |
| relative density | A | A | A | A | A | A | A | A | A |
| bending strength | B | A | A | A | A | A | A | A | A |
| grain size | B | B | A | A | A | A | A | A | A |
| porosity | A | A | B | A | A | A | A | B | A |
| precision machinability | A | A | A | A | A | A | A | A | A |
| machinability | A | A | A | A | A | B | B | C | C |
| wear-resistance | B | B | B | A | A | A | A | A | A |
| read output loss | B | B | B | B | A | A | A | A | A |

(NOTE)
The wear-resistant property was measured and evaluated by so called "pin-on-disc" method, wherein a disc made of the same component as that of the chromium-type recording medium is rotated and each of pins (fixed piece) made of the abovementioned various specimens is placed on the rotating disc. The evaluation is classified into the following three categories.

A adhesion wear (due to adhesion of the disc component to the pin) and wear of the disc due to dropped-out particles are small, and sliding property is excellent;

B adhesion of the disc component to the pin and occurrence of dropped-out particles are observed, but the degree of wear of the pin is very small;

C adhesion wear and wear due to dropped-out particles are observed, but the degree of wear of the pin is equal to the conventional products.

TABLE 6

| weight % | | | | | | | | | |
|---|---|---|---|---|---|---|---|---|---|
| TiC component | 30 | 30 | 30 | 30 | 30 | 30 | 30 | 30 | 30 |
| $Al_2O_3$ component | 64.65 | 64.6 | 64.3 | 63.8 | 59.8 | 54.8 | 44.8 | 39.8 | 37.3 |
| $Y_2O_3$ | 0.2 | 0.2 | 0.2 | 0.2 | 0.2 | 0.2 | 0.2 | 0.2 | 0.2 |
| $ZrO_2$ component | 5 | 5 | 5 | 5 | 5 | 5 | 5 | 5 | 5 |
| AlN | 0.15 | 0.2 | 0.5 | 1 | 5 | 10 | 20 | 25 | 27.5 |
| relative density | A | A | A | A | A | A | A | A | A |
| bending strength | C | B | A | A | A | A | A | A | A |
| grain size | A | A | A | A | A | A | A | A | A |
| porosity | A | A | A | A | A | A | A | A | B |
| precision machinability | B | A | A | A | A | A | A | A | A |
| machinability | B | B | A | A | A | A | A | A | A |
| wear-resistance | A | A | A | A | A | A | B | B | C |
| read output loss | C | B | B | A | A | A | A | A | A |

In the next place, after the test specimens of various compositions were subjected to the precise lapping, the crystal grain size and the micropores were respectively examined by observation of the crystal grains of the titanium carbide component on micro-graphs, and by observation on scanning electron micrographs of the broken-out sections of the specimens separately used for measurement of the bending strength.

The precision machinability was evaluated in such a manner that, depending on the degree of micro-chipping which had been generated at the edge portion while the material was being machined in conformity to a track width of the disc head slider, a rating "C" was given to the material which was not favorable for practical use; a rating "B" was given to the material which generated the least chipping on its edge portion, hence no problem in its practical use; and a rating "A" was given to the material which was particularly excellent in the non-occurrence of chipping.

The machinability (particularly grindability) was evaluated in such a manner that a rating "C" was given to the material which required a prolonged time for cutting the same cross-sectional area under the condition wherein the gravity of a weight having a certain definite mass is exerted as a component of force for feeding the material for cutting, hence it was not favorable from the standpoint of productivity; a rating "B" was given to the material having no particular problem in its productivity; and a rating "A" was given to the material which was short in its required cutting time.

Grain Size: The sintered body having an average crystal grain size of 1 μm or below was rated "A"; the sintered body having its crystal grain size in a range of from 1 to 1.5 μm was rated "B"; and the sintered body having its average crystal grain size of 1.5 μm or above was rated "C".

Porosity: As for the micropores remaining in the micro-structure of the material, ones containing therein the pores having the size of 1 μm or above was rated "C"; ones containing therein the pores having the size of below 1 μm but the number of pores as observed was comparable with the conventional product was rated "B"; and ones containing therein particularly small number of pores having the size of below 1 μm was rated "A".

The toughness of the material was evaluated in terms of its bending strength: the material having the bending strength of below 60 kgf/mm² was rated "C"; the material having the bending strength in a range of from 60 to 70 kgf/mm² was rated "B"; and the material having the bending strength of above 70 kgf/mm² was rated "A".

As to the relative density, the material having the relative density of above 99.4% was rated "A"; the material having the relative density in a range of from 99.0 to 99.4% was rated "B"; and the material having the relative density of below 99.0% was rated "C".

As for the read output loss (dB), the material having the read output loss which is comparable with that of the conventional product (−2 dB or below) as evaluated by the shoe-shine test for 10,000 times was rated "C"; the material having an excellent low read output loss (in a range of from −2 dB to −1 dB) was rated "B"; and the material having an exceedingly superior low read output loss (in a range of from −1 dB to 0) was rated "A".

Concerning the hot isostatic press (HIP) sintering method, the materials having various compositions were produced and examined. As the result, it was found out that, except the average crystal grain size being larger by about 0.2 μm than that of the material obtained from the hot press method, the characteristic properties of these materials were substantially same as those shown in Tables 4 and 5 above.

The oxides of Ti, Ta and Nb in Tables 1, 2 and 3 are indicated by "%" where it is meant by "wt. %" in terms of their content in the TiC component and/or TiC and the TiC substituent as recited in the appended Claim 3; and the machinability agent is indicated by "%" where it is meant by "wt. %" when it is substituted for aluminum oxide (a ratio in the $Al_2O_3$ component).

EXAMPLE 2

α-$Al_2O_3$ substituted with 10% by weight of MgO having its purity of 99.9% and an average particle size of 0.5 μm, TiC and TiC-$TiO_2$ solid-solution having its purity of 99.9% and an average particle size of 1 μm or below, a sintering aid and machinability agent of AlN, $ZrO_2$ and $Al_2O_3$-$Y_2O_3$ solid solution were charged at their predetermined ratios into a ball mill (mixer), and subjected to wet-mixing for 40 hours. Thereafter, a binder for compacting was added to the obtained sludge and then gradulated in a spray granulator, after which the granulated material was dried and made into starting material powder.

The powder material was then compacted by a press in a metal mold of 60×60 mm, from which the binder was removed by the vacuum-heating. The thus shaped material was then subjected to the pre-sintering in an inactive gas at a temperature in a range of from 1,450° C. to 1,800° C., after which the pre-sintered body was held in an argon gas atmosphere at a temperature of 1,400° C. and under a pressure of 1,000 kg/mm² for 60 minutes by use of a hot isostatic pressing (HIP) device, followed by cooling the same to thereby obtain a sintered body having a dimension of 50×50×3 t (mm). Further, the sintered body was heat-treated under a pressure in a range of from 0 to 10 kg/cm² and in a temperature range of from 1,300° C. to 1,500° C. As the result, there was obtained a resultant product free from generation of micro-chipping which might occur due to the stress-relief during the precision machining, and highly excellent in the integrity of the coating film. Table 7 below shows the material compositions, wherein the quantity of the titanium carbide component (TiC+$TiO_2$) were made variable, and their characteristic properties.

TABLE 7

| | Sample No. | | | | | | | | |
|---|---|---|---|---|---|---|---|---|---|
| | 1 | 2 | 3 | 4 | 5 | 6 | 7 | 8 | 9 |
| Composition (wt %) | | | | | | | | | |
| $Al_2O_3$ component | 84.5 | 83.5 | 78.5 | 73.5 | 68.5 | 63.5 | 53.5 | 43.5 | 38.5 |
| TiC component | 3.68 | 4.6 | 9.2 | 13.8 | 18.4 | 22.6 | 32.0 | 41.4 | 46.0 |
| $TiO_2$ | 0.32 | 0.4 | 0.8 | 1.2 | 1.6 | 2.4 | 3.0 | 3.6 | 4.0 |
| AlN | 10 | 10 | 10 | 10 | 10 | 10 | 10 | 10 | 10 |
| MgO | 1.0 | 1.0 | 1.0 | 1.0 | 1.0 | 1.0 | 1.0 | 1.0 | 1.0 |
| $ZrO_2$ component | 0.25 | 0.25 | 0.25 | 0.25 | 0.25 | 0.25 | 0.25 | 0.25 | 0.25 |
| $Y_2O_2$ | 0.25 | 0.25 | 0.25 | 0.25 | 0.25 | 0.25 | 0.25 | 0.25 | 0.25 |
| optimum presintering temperature (°C.) | 1480 | 1515 | 1530 | 1560 | 1600 | 1630 | 1680 | 1720 | 1770 |
| relative density of presintered body (%) | 96.1 | 95.0 | 95.5 | 94.5 | 97.2 | 94.9 | 96.9 | 95.8 | 96.8 |
| relative density of HIP-body (%) | 99.6 | 99.5 | 99.5 | 99.4 | 99.7 | 99.6 | 99.7 | 99.5 | 99.4 |
| hardness ($H_RA$) | 93.1 | 93.3 | 93.6 | 93.6 | 93.7 | 93.9 | 93.9 | 93.8 | 94.0 |
| bending strength (kg/mm²) | 46 | 63 | 67 | 66 | 72 | 74 | 77 | 71 | 62 |

As it may be inferred from Table 7 above, the addition of TiC with respect to $Al_2O_3$ exhibits the improved effect in various physical values such as toughness, hardness, etc. with elevation of the optimum pre-sintering temperature. In particular, the improvement in the toughness and the inhibition of the grain growth are important, since the material according to the present invention is required to have the ultra-precision machinability. In case the quantity of TiC is as small as 5% by weight or below and the quantity of $Al_2O_3$ is large, MgO is present among the alumina crystal grains, which functions as the sintering aid as well as the grain growth inhibitor. On the other hand, however, the grain growth of $Al_2O_3$ is somewhat greater in comparison with the case, wherein the amount of TiC is 5% by weight or more, on account of which the toughness of the product (material) is lowered and the chipping and the defects tend to occur easily. As the consequence, the resultant material is considered unsuitable as the material for the magnetic head substrate member. While it is possible to cause TiC to be coexistent with MgO at the crystal grain boundary of $Al_2O_3$ by dispersion of TiC to thereby control the grain growth, such ingredient tends to readily invite chipping due to dropping-out of the crystal grains during the ultra-precision machining. However, by addition of $TiO_2$ and AlN together, the chipping due to dropping-out of the crystal grains tends to decrease.

The reason for this is considered such that $TiO_2$ is present between the grains of $Al_2O_3$ and TiC to produce the complex oxides of $Al_2O_3$, TiC and $TiO_2$ at the time of the sintering to thereby strengthen the bonding at the grain boundary, and that AlN also functions as the binder for $Al_2O_3$ and TiC to thereby increase the bonding force at the grain boundary with simultaneous inhibition of the crystal grain growth. By the way, the function and effect of $TiO_2$ and AlN are such that similar results can be obtained even in the case of substituting 10 to 50% by weight of TiC with other carbides, nitrides, borides and composite compounds thereof, whereby the crystal grain size of the sintered body is in a range of from 0.5 to 2 μm so that it may maintain an uniform and densified state. This grain size is fairly small in comparison with the conventional ferrite type and cendust type substrates. On account of this, the obtained ceramic material will possess its toughness to be durable against chipping during the ultra-precision machining, which is required of the material according to the present invention to be used as the magnetic head substrate member. In the test of this example, the compacted body is sintered (pre-sintered) in an inactive gas, and further subjected to the hot isostatic pressing (HIP) treatment for its densification for which purpose the relative density of the resultant pre-sintered body should preferably range from 94 to 98% in terms of the theoretical density ratio. That is to say, when the sintering temperature is raised at the time of the pre-sintering, the relative density increases; however, the grain growth is promoted to make the material unsuitable for the magnetic head substrate member. Inversely, when the pre-sintering temperature is lowered, no grain growth takes place, but the pre-sintered body having its relative density of 94% and above cannot be obtained, hence its densification is impossible even if it is subjected to the HIP treatment. It is therefore necessary that the pre-sintering be carried out at such a pre-sintering temperature (the optimum pre-sintering temperature) that does not bring about the grain growth at the relative density of the material being 94% or above.

As it may be recognized from Table 7 above, with increase in the quantity of TiC, the pre-sintering temperature tends to be elevated. For example, with the quantity of the TiC component (TiC+$TiO_2$) being 45% by weight or below, there will be obtained the pre-sintered body capable of being treated for the hot isostatic pressing at a temperature of 1,750° C. or below. In other words, the grain size of the sintered body is governed by the pre-sintering temperature irrespective of the hot isostatic pressing (HIP). When the pre-sintering temperature exceeds 1,750° C., the crystal grains grow conspicuously. In this sense, it is preferable that the pre-sintering temperature be as low as possible. Incidentally, in the test according to this example, use was made of the TiC-$TiO_2$ solid-solution and TiC. It should however be noted that the same result can be obtained even with simple TiC and $TiO_2$.

What is claimed is:

1. A magnetic head substrate member having improved machinability and formed of a sintered material which is obtained by sintering a mixture consisting essentially of: 5 to 45% by weight of titanium carbide component; 0.2 to 10% by weight of zirconium oxide; 0.05 to 2% by weight of oxide of yttrium; 0.2 to 25% by weight of aluminum nitride; and the balance being $Al_2O_3$ component substituted with 0.5 to 8% by weight of at least one machinability agent selected from the group consisting of oxides of Mg, Ca, B, Ni and Cr and complex oxides thereof, wherein said oxide of yttrium is present in the form of a complex oxide with $Al_2O_3$ in the sintered material.

2. The magnetic head substrate member as defined in claim 1, wherein said titanium carbide component is one selected from the group consisting of TiC and titanium carbide components containing therein an effective amount of metal oxide (M.O.), which comprises oxides of Ti, Ta or Nb.

3. The magnetic head substrate member as defined in claim 2, wherein said metal oxide (M.O.) consists of at least one selected from the group consisting of oxides of Ti, Ta and Nb; complex oxides thereof; suboxides thereof; and oxy-carbides thereof, the ratio of said metal oxide (M.O.) to said titanium carbide component containing therein a substituent component of the metal oxide (M.O.) being 15% or below by weight except zero.

4. The magnetic head substrate member as defined in claim 2 or 3, wherein 10 to 50% by weight of TiC is substituted with at least one selected from the group consisting of carbides, nitrides, and borides of the subgroups IVa, Va and VIa metals in the International Periodic Table, and composite compounds thereof.

5. The magnetic head substrate member as defined in Claim 1, wherein said zirconium oxide is partially stabilized zirconia.

6. The magnetic head substrate member as defined in claim 1, wherein said substrate material has an average crystal grain size of 2 μm or below and a relative density of 99% or above.

7. The magnetic head substrate member as defined in claim 7, wherein said material has been sintered by a pressure-sintering method.

8. The magnetic head substrate member as defined in claim 6, wherein said material has been heat-treated after pressure-sintering to be substantially free of stress.

9. The magnetic head substrate member as defined in claim 2, wherein said material is sintered by a hot isostatic pressure-sintering method or a hot press method, as the pressure-sintering method.

10. The magnetic head substrate member as defined in claim 3, wherein said ratio of the metal oxide to the titanium carbide component containing therein the substituent component of metal oxide (M.O.) ranges from 5 to 15% by weight.

11. The magnetic head substrate member as defined in claim 1, wherein the content of said $Al_2O_3$ component is at least 18% by weight.

12. The magnetic head substrates member as defined in claim 11, wherein the content of said $Al_2O_3$ component is in a range from 35 to 88% by weight.

13. The magnetic head substrate member as defined in claim 4, wherein said IVa, Va and VIa subgroup metal is at least one selected from the group consisting of Ti, Zr, V, Nb, Ta, Hf, Cr, W and Mo.

14. The magnetic head substrate member as defined in claim 5, wherein said zirconium oxide is partially stabilized with at least one stabilizing agent of the class consisting of 1–6 mol % $Y_2O_3$, 6–12 mol % MgO and/or CaO, and 6–10 mol % Ceo, per $ZrO_2$.

15. The magnetic head substrate member as defined in claim 1, wherein said complex oxide having the garnet structure is garnets expressed by general formulas ranging from $Y_3(Al,Y)_2(AlO_4)_3$ to $(Y,Al)_3Al(AlO_4)_3$.

16. The magnetic head substrate member as defined in claim 3, wherein said metal oxide is partially present as a solid-solution with TiC.

17. The magnetic head substrate member as defined in claim 8, wherein said material has been heat-treated at a temperature ranging from 1,000° C. to the sintering temperature plus 100° C. under an applied pressure of from 0 to 10 =kgf/cm².

18. The magnetic head substrate member as defined in claim 2, wherein said TiC component has been subjected to the preliminary heat-treatment at a temperature ranging from 500° C. to 1,500° C. in a nonoxidizing atmosphere to reduce micro-pore formation.

19. The magnetic head substrate member as defined in claim 1, wherein said $Al_2O_3$ component has been preheated at a temperature of from 650° C. to 1,300° C. to bind the $Al_2O_3$ component.

20. The magnetic head substrate member as defined in claim 12, wherein said machinability agent is present in an amount of 1-6% by weight.

21. The magnetic head substrate member as defined in claim 12, wherein said machinability agent is an oxide of B.

22. The magnetic head substrate member as defined in claim 1, wherein said aluminum nitride is at least 1.0% by weight.

23. The magnetic head substrate member as defined in claim 12, wherein said $Al_2O_3$ component is at least about 40% by weight.

24. A magnetic head substrate member having improved machinability and formed of a sintered material which is obtained by sintering a mixture consisting essentially of:
- 5 to 45% by weight of titanium carbide component which is selected from the group consisting of TiC and titanium carbide components containing therein metal oxide (M.O.), said metal oxide (M.O.) being at least one selected from the group consisting of oxides of Ti, Ta and Nb; complex oxides thereof; suboxides thereof; and oxy-carbides thereof; the ratio of the metal oxide (M.O.) to said titanium carbide components containing therein the metal oxide (M.O.) being 15% or below by weight,
- 0.2 to 10% by weight of zirconium oxide,
- 0.05 to 2% by weight of oxide of yttrium,
- 0.2 to 25% by weight of aluminum nitride, and
- the balance being $Al_2O_3$ component substituted with 0.5 to 8% by weight of at least one machinability agent selected from the group consisting of oxides of Mg, Ca, B, Ni and Cr and complex oxides thereof,
- 10 to 50% by weight of said TiC being substituted with at least one selected from the group consisting of carbides, and nitrides of Ti, Zr, V, Nb, Ta, Hf, Cr, W and Mo, borides of Zr, V, Nb, Ta, Hf, Cr, W and Mo and composite compounds thereof,
- wherein said oxide of yttrium is present in the form of a complex oxide with $Al_2O_3$ in the sintered material.

25. The magnetic head substrate member as defined in claim 24, wherein said complex oxide with $Al_2O_3$ is at least one compound selected from the group consisting of garnets expressed by general formulas ranging from $Y_3(Al,Y)_2(AlO_4)_3$ to $(Y,Al)_3Al(AlO_4)_3$, and complex oxides expressed by a general formula $Y_xAl_{1-x}O_3$ (where: $x<1$).

26. The magnetic head substrate member a defined in claim 25, wherein said complex oxide with $Al_2O_3$ is garnet having a structure of garnet.

27. The magnetic head substrate member as defined in claim 1, which has a read output loss of $-2$ dB or above when tested by a shoe-shine test for 10,000 times.

28. The magnetic head substrate member as defined in claim 27, wherein the read output loss if $-1$ dB to zero.

29. The magnetic head substrate member as defined in claim 24, which has a read output loss of $-1$ dB or above when tested by a shoe-shine test for 10,000 times.

30. The magnetic head substrate member as defined in claim 29, wherein the read output loss is $-1$ dB to zero.

* * * * *

UNITED STATES PATENT AND TRADEMARK OFFICE
CERTIFICATE OF CORRECTION

PATENT NO. : 4,902,651
DATED : February 20, 1990
INVENTOR(S) : Toshiaki WADA, et al.

It is certified that error appears in the above-identified patent and that said Letters Patent is hereby corrected as shown below:

ON TITLE PAGE:
Name of the first assignee is changed to:

--SUMITOMO SPECIAL METALS, CO., LTD.

In the Specification the following changes are made:

| Column | Line | Incorrect | Correct |
|--------|------|-----------|---------|
| 24 | 27 | Claim 7 | Claim 6 |
| 24 | 30 | Claim 6 | Claim 7 |
| 24 | 33 | Claim 2 | Claim 7 |
| 26 | 31 | if | is |
| 26 | 33 | -1 | -2 |

Signed and Sealed this

Thirty-first Day of December, 1991

Attest:

HARRY F. MANBECK, JR.

Attesting Officer     Commissioner of Patents and Trademarks